(12) United States Patent
Pu et al.

(10) Patent No.: US 12,013,237 B2
(45) Date of Patent: Jun. 18, 2024

(54) QUASI-ZERO-STIFFNESS BASED SIX-DEGREE-OF-FREEDOM ABSOLUTE DISPLACEMENT AND ATTITUDE MEASUREMENT DEVICE

(71) Applicants: Chongqing University, Chongqing (CN); Shanghai University, Shanghai (CN)

(72) Inventors: Huayan Pu, Shanghai (CN); Jinglei Zhao, Shanghai (CN); Jun Luo, Shanghai (CN); Jiyun Zhao, Shanghai (CN); Qinghua Kong, Shanghai (CN); Jiheng Ding, Shanghai (CN); Min Wang, Shanghai (CN); Yi Sun, Shanghai (CN); Zong Li, Shanghai (CN); Long Bai, Shanghai (CN); Yan Peng, Shanghai (CN); Shaorong Xie, Shanghai (CN)

(73) Assignees: Chongqing University, Chongqing (CN); Shanghai University, Shanghai (CN)

( * ) Notice: Subject to any disclaimer, the term of this patent is extended or adjusted under 35 U.S.C. 154(b) by 584 days.

(21) Appl. No.: 17/121,648

(22) Filed: Dec. 14, 2020

(65) Prior Publication Data
US 2022/0003532 A1 Jan. 6, 2022

(30) Foreign Application Priority Data
Jul. 6, 2020 (CN) .......................... 202010640133.0

(51) Int. Cl.
*G01B 7/008* (2006.01)
*G01B 7/06* (2006.01)
*G01B 7/14* (2006.01)

(52) U.S. Cl.
CPC ............. *G01B 7/008* (2013.01); *G01B 7/102* (2013.01); *G01B 7/14* (2013.01)

(58) Field of Classification Search
CPC .......... G01B 7/008; G01B 7/14; G01B 7/102
See application file for complete search history.

(56) References Cited

U.S. PATENT DOCUMENTS

| | | | | |
|---|---|---|---|---|
| 2007/0284502 A1* | 12/2007 | Hsin | ...................... | G02B 7/005 248/495 |
| 2019/0072373 A1* | 3/2019 | Iseli | ...................... | G01B 5/0004 |

FOREIGN PATENT DOCUMENTS

CN 102692201 9/2012

OTHER PUBLICATIONS

Zhou, Jiaxi, et al. "A Six Degrees-of-Freedom Vibration Isolation Platform Supported by a Hexapod of Quasi-Zero Stiffness Struts", Journal of Vibration and Acoustics, Jun. 2017, vol. 139. (Year: 2017).*

(Continued)

*Primary Examiner* — Paul M. West
(74) *Attorney, Agent, or Firm* — Fish IP Law, LLP

(57) ABSTRACT

The present invention discloses a quasi-zero-stiffness (QZS) based six-degree-of-freedom (6-DOF) absolute displacement and attitude measurement device. A lower end coil and an upper end coil are respectively charged with currents in the opposite directions; The electromagnetic field and the magnetic fields of an upper magnet and a lower magnet per se are mutually acted to produce an electromagnetic stiffness opposite to the stiffness of a spring. The stiffness of the whole leg is close to zero stiffness. When the to-be-measured platform generates space motion, the reference platform is in the stationary state. At this point, the deformation amounts of the six legs can be measured by laser displacement sensors. The six deformation amounts are respectively inputted into the displacement and attitude resolver, and by (Continued)

forward kinematic solution of the 6-DOF device, the displacement and the attitude of the to-be-measured platform can be obtained.

8 Claims, 3 Drawing Sheets

(56) References Cited

OTHER PUBLICATIONS

Machine translation of text of Foreign Patent Document 1, 11 pp.

* cited by examiner

QUASI-ZERO-STIFFNESS BASED SIX-DEGREE-OF-FREEDOM ABSOLUTE DISPLACEMENT AND ATTITUDE MEASUREMENT DEVICE

TECHNICAL FIELD

The present invention relates to the field of absolute displacement measurement technologies, and in particular, to a quasi-zero-stiffness (QZS) based six-degree-of-freedom (6-DOF) absolute displacement and attitude measurement device.

BACKGROUND

Absolute displacement measurement is widely applied to the industrial production line, the precision engineering, the scientific researches, etc. In the vibration active control field, multiple feedback manners have been widely applied. Wherein, the absolute position feedback has remarkable characteristics in the aspects of low frequency vibration elimination and improvement on the robustness to the external interference. The reason is that a vibration isolation system based on the absolute displacement feedback has low vibration transmissibility and low dynamic compliance. Generally, position feedback is achieved by measuring the absolute displacement of one load or device. The researchers have proposed some methods for measuring the absolute motion of the object, including integrating acceleration or speed signals. However, the previous method may introduce undesired time delay and error accumulation in the acceleration signal integrating process, likely causing control failure. The latter method needs a speed sensor, such as a geophone and the like, thereby having relatively higher costs. A laser displacement sensor and a linear variable differential transformer can be used for measuring the relative displacement between a to-be-measured device and the sensor. If the absolute displacement of the object needs to be measured, the sensor should be mounted at an absolutely stationary point, which obviously is unrealistic to the absolute displacement measurement of a mobile platform and its attached devices (such as the distance between a moving automobile and the ground, the fluctuation of a surface ship relative to the water level, etc.).

Moreover, the above displacement measurement methods can only measure the single degree of freedom, but cannot measure the displacement and the attitude of the object in space. The Chinese Patent Application with application number CN201210203199.9 discloses a space 6-DOF motion measurement device and a dynamic measurement method. The 6-DOF motion of the object in space can be completed simply and reliably. The measurement is accurate. However, the measurement device must be firstly fixed to a stationary object before the measurement is completed, which is unrealistic to the moving object (such as the above-mentioned moving automobile, ship, etc.).

SUMMARY

The objective of the present invention is to propose a QZS based 6-DOF absolute displacement and attitude measurement device to solve the problems in the prior art. The absolute stationary state of a reference platform can be achieved by QZS legs, wherein the absolute motion measurement of a to-be-measured object is converted into the relative motion measurement. Therefore, the device has strong applicability, wide measurement range, and high accuracy.

To achieve the above objective, the present invention provides the following solution: a QZS based 6-DOF absolute displacement and attitude measurement device proposed by the present invention comprises a reference platform, a to-be-measured platform, a displacement and attitude resolver, and six QZS legs with the same structures. Two ends of the QZS leg are respectively connected with the reference platform and the to-be-measured platform through spherical joints.

The QZS leg comprises a lower support, a spring, a shaft, a lower end coil, an upper end coil, a lower end magnet, an upper end magnet, an upper support, and a laser displacement sensor. The upper end magnet and the lower end magnet are in the mutual repulsion state and are respectively fixed to the shaft through two retaining rings. The lower end coil and the upper end coil are located on the outer sides of the two magnets and are fixed to the inner wall of the lower support. There is no relative motion among the two coils and the lower support. A space is reserved between the lower end coil and the upper end coil; the lower end coil and the upper end coil are charged with currents in the opposite directions. One end of the shaft is connected with the end part of the inner wall of the lower support through the spring, and the other end is connected with the end part of the upper support. The laser displacement sensor is used for measuring the deformation amounts of the six legs. The six laser displacement sensors input the information into the displacement and attitude resolver. The displacement and attitude resolver solves to obtain the displacement and the attitude of the to-be-measured platform.

Preferably, the upper end magnet and the lower end magnet have the same appearances and structures, and their magnetizing directions are axial. The two magnets are in the mutual repulsion state.

Preferably, the two retaining rings are respectively a lower end retaining ring and an upper end retaining ring. The upper end magnet and the lower end magnet are respectively fixed to the shaft through the upper end retaining ring and the lower end retaining ring. The two retaining rings are in dead lock.

Preferably, the upper end coil and the lower end coil have the same appearances and structures. The axial thickness of the coil is the same as the axial thickness of the magnet.

Preferably, the width of the space between the upper end coil and the lower end coil is equal to the axial thickness of the coil.

Preferably, the inner diameters of the upper end coil and the lower end coil are larger than the outer diameters of the lower end magnet and the upper end magnet.

Preferably, one end of the upper support is nested in the inner wall of the lower support and is connected with the shaft, and the other end is connected with the reference platform through a spherical joint.

Preferably, the laser displacement sensor is mounted on the outer wall of the non-nested end of the upper support, and a space is reserved between the laser displacement sensor and the end part of the lower support.

The present invention achieves the following technical effects compared with the prior art:

The QZS based 6-DOF absolute displacement and attitude measurement device of the present invention can achieve the absolute stationary state of the reference platform by the QZS legs, wherein the absolute motion measurement of the to-be-measured object is converted into the relative motion measurement. Therefore, the device has strong applicability, wide measurement range, and high accuracy.

BRIEF DESCRIPTION OF THE DRAWINGS

To describe the technical solutions in the embodiments of the present invention or in the prior art more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

Figure 1:
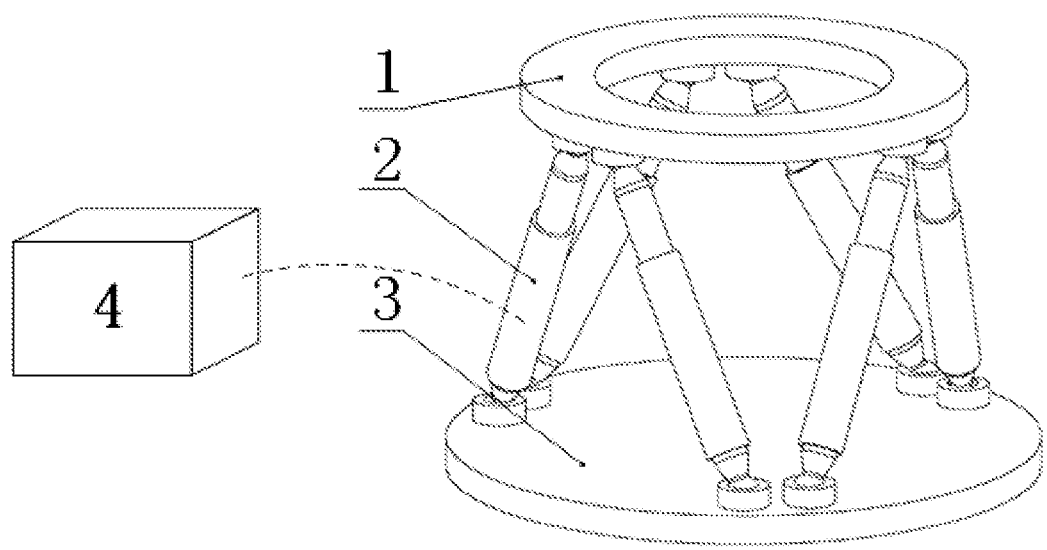
FIG. 1 is an axonometric drawing of a 6-DOF absolute displacement and attitude measurement device.

In the drawings: 1—reference platform, 2—QZS leg, 201—lower end spherical joint, 202—upper end spherical joint, 203—lower support, 204—spring, 205—shaft, 206—lower end coil, 207—upper end coil, 208—lower end magnet, 209—upper end magnet, 210—upper support, 211—lower end retaining ring, 212—upper end retaining ring, 213—laser displacement sensor, 3—to-be-measured platform, and 4—displacement and attitude resolver.

DESCRIPTION OF THE EMBODIMENTS

The following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

The objective of the present invention is to propose a QZS based 6-DOF absolute displacement and attitude measurement device to solve the problems in the prior art. The absolute stationary state of a reference platform can be achieved by QZS legs, wherein the absolute motion measurement of a to-be-measured object is converted into the relative motion measurement. Therefore, the device has strong applicability, wide measurement range, and high accuracy.

The QZS based 6-DOF absolute displacement and attitude measurement device of the present invention comprises a reference platform, a to-be-measured platform, a displacement and attitude resolver, and six QZS legs with the same structures. Two ends of the QZS leg are respectively connected with the reference platform and the to-be-measured platform through spherical joints. The QZS leg comprises a lower support, a spring, a shaft, a lower end coil, an upper end coil, a lower end magnet, an upper end magnet, an upper support, and a laser displacement sensor. The upper end magnet and the lower end magnet are in the mutual repulsion state and are respectively fixed to the shaft through two retaining rings. The lower end coil and the upper end coil are located on the outer sides of the two magnets and are fixed to the inner wall of the lower support. There is no relative motion among the two coils and the lower support. A space is reserved between the lower end coil and the upper end coil; the lower end coil and the upper end coil are charged with currents in the opposite directions. One end of the shaft is connected with the end part of the inner wall of the lower support through the spring, and the other end is connected with the end part of the upper support. The laser displacement sensor is used for measuring the deformation amounts of the six legs. The six laser displacement sensors input the information into the displacement and attitude resolver. The displacement and attitude resolver solves to obtain the displacement and the attitude of the to-be-measured platform.

The lower end coil and the upper end coil are respectively charged with currents in the opposite directions. At this time, these two coils produce an electromagnetic field in their surrounding space. The electromagnetic field and the magnetic fields of the upper magnet and the lower magnet per se are mutually acted to produce an electromagnetic stiffness opposite to the stiffness of the spring. Because the stiffness of the spring is positive, such electromagnetic stiffness is called negative stiffness. Such electromagnetic stiffness and the stiffness of the spring are counteracted mutually; so, the stiffness of the whole leg is close to zero stiffness and is generally called quasi zero stiffness (QZS). When the to-be-measured platform generates space motion, such motion cannot be transferred to the reference platform; so, the reference platform is in the stationary state. At this point, the deformation amounts of the six legs can be measured by laser displacement sensors. The six deformation amounts are respectively inputted into the displacement and attitude resolver, and by forward kinematic solution of the 6-DOF device, the displacement and the attitude of the to-be-measured platform can be obtained.

To make the foregoing objective, features, and advantages of the present invention more apparent and more comprehensible, the present invention is further described in detail below with reference to the accompanying drawings and specific embodiments.

Figure 2:
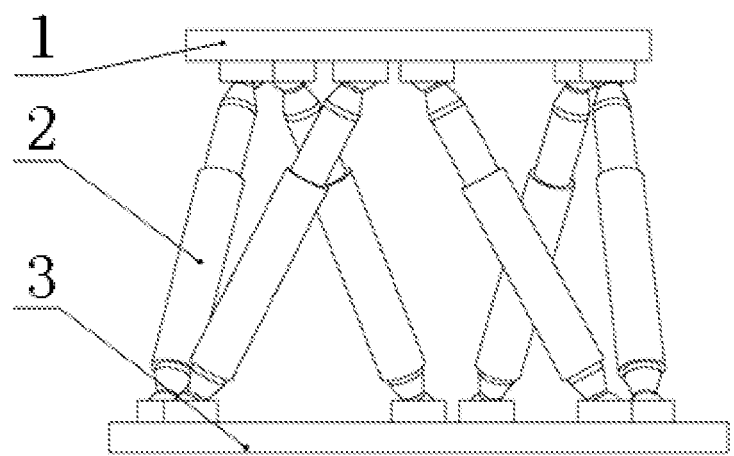
FIG. 2 is a front view of a 6-DOF absolute displacement and attitude measurement device.
Figure 3:
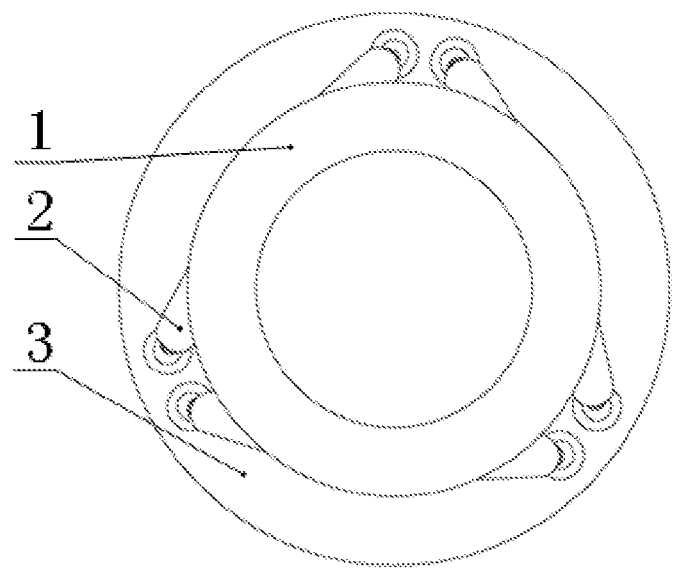
FIG. 3 is a top view of a 6-DOF absolute displacement and attitude measurement device.
Figure 4:
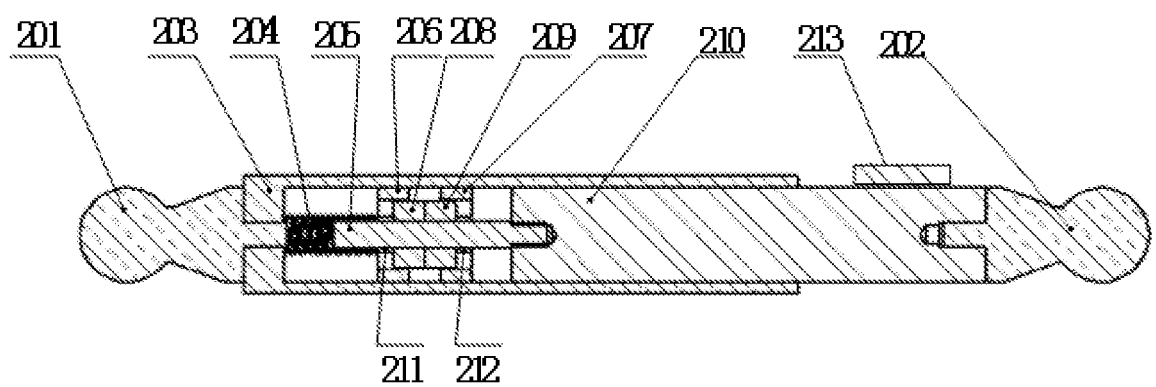
FIG. 4 is a sectional view of a leg.
Figure 5:
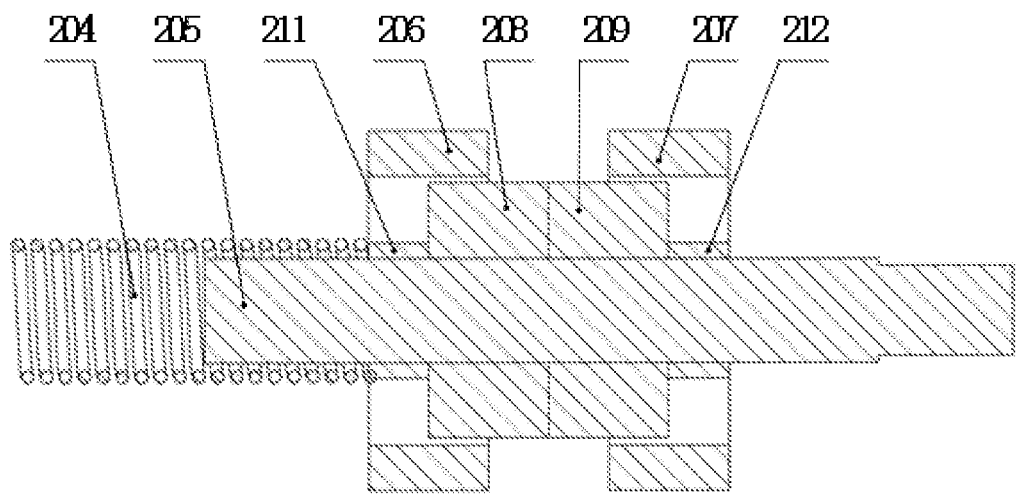
FIG. 5 is a sectional view of a zero stiffness mechanism.
Figure 6A:
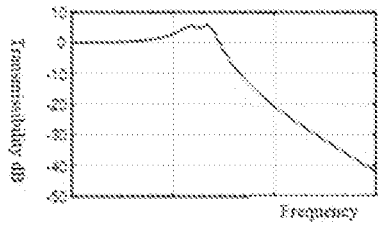
FIG. 6A shows motion transmissibility along the x axis.
Figure 6B:
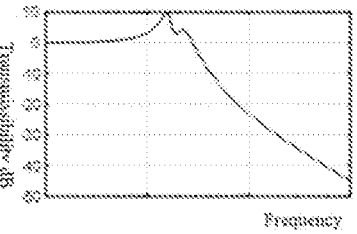
FIG. 6B shows motion transmissibility along the y axis.
Figure 6C:
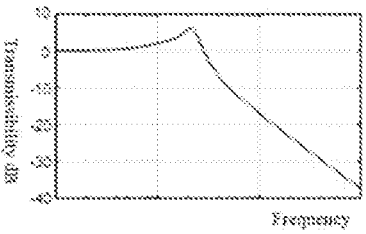
FIG. 6C shows motion transmissibility along the z axis.
Figure 6D:
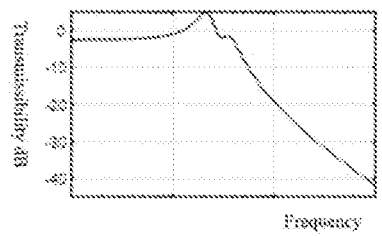
FIG. 6D shows motion transmissibility around the x axis.
Figure 6E:
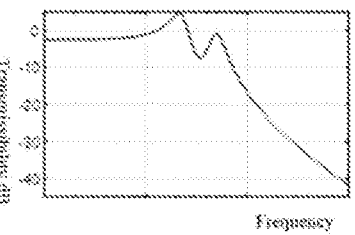
FIG. 6E shows motion transmissibility around the y axis.
Figure 6F:
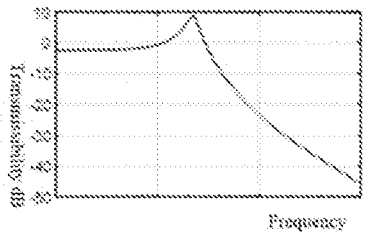
FIG. 6F shows motion transmissibility around the z axis.
Figure 7A:
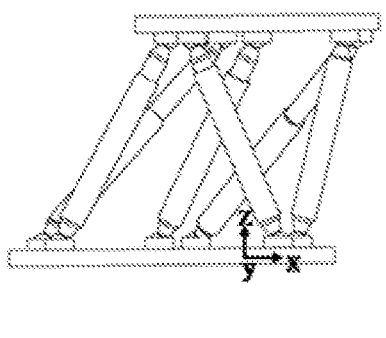
FIG. 7A is a schematic diagram showing a translation motion along the x axis.
Figure 7B:
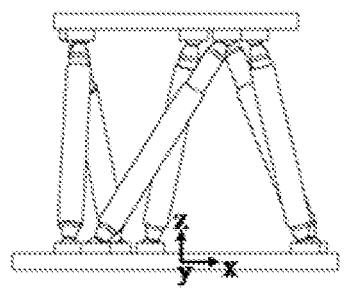
FIG. 7B is a schematic diagram showing a translation motion along the y axis.
Figure 7C:
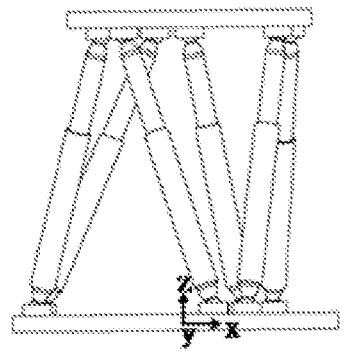
FIG. 7C is a schematic diagram showing a translation motion along the z axis.
Figure 7D:
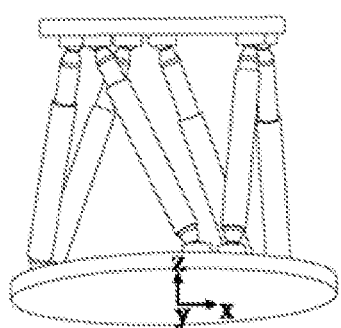
FIG. 7D is a schematic diagram showing a rotation motion around the x axis.
Figure 7E:
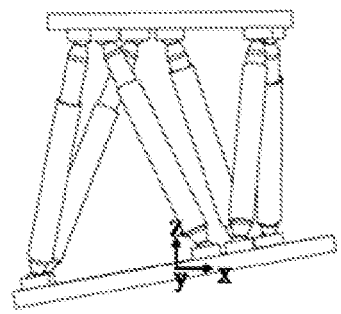
FIG. 7E is a schematic diagram showing a rotation motion around the y axis.
Figure 7F:
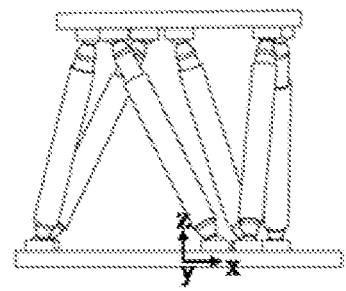
FIG. 7F is a schematic diagram showing a rotation motion around the z axis.

As shown in FIG. 1 to FIG. 7F, the embodiment proposes a QZS based 6-DOF absolute displacement and attitude measurement device. The device comprises four parts: a reference platform 1, six totally same QZS legs 2, a to-be-measured platform 3, and a displacement and attitude resolver 4.

Specifically, the QZS leg 2 comprises:

a lower end spherical joint 201, an upper end spherical joint 202, a lower support 203, a spring 204, a shaft 205, a lower end coil 206, an upper end coil 207, a lower end magnet 208, an upper end magnet 209, an upper support 210, a lower end retaining ring 211, an upper end retaining ring 212, and a laser displacement sensor 213. The upper magnet 209 and the lower magnet 208 are in the mutual repulsion state and are respectively fixed to the shaft 205 through the two retaining rings. The lower end coil 206 and the upper end coil 207 are located on the outer sides of the two magnets and are fixed to the inner wall of the lower support 203. There is no relative motion among the two coils and the lower support 203. A space is reserved between the lower end coil 206 and the upper end coil 207; the lower end coil 206 and the upper end coil 207 are charged with currents in the opposite directions. One end of the shaft 205 is connected with the end part of the inner wall of the lower support 203 through the spring 204, and the other end is connected with the end part of the upper support 210. The laser displacement sensor 213 is used for measuring the deformation amounts of the six legs. The six laser displacement sensors 213 input the information into the displacement and attitude resolver 4. The displacement and attitude resolver solves to obtain the displacement and the attitude of the to-be-measured platform 3.

The basic principle of the QZS based 6-DOF absolute displacement and attitude measurement device in the present invention mainly comprises two parts: the QZS realization principle of the leg and the measurement principle of the whole device.

Wherein the QZS realization principle is as follows:

The lower magnet 208 and the upper magnet 209 have the same appearances and structures, and their magnetizing directions are axial. The two magnets are in the mutual repulsion state. The two axial retaining rings are as follows: the lower end retaining ring 211 and the upper end retaining ring 209 are fixed to the shaft 205. The retaining rings are in dead lock to ensure that the lower magnet 208 and the upper magnet 209 are in mutually close contact.

The lower end coil 206 and the upper end coil 207 are fixed to the inner wall of the lower support 203. There is no relative motion among the two coils and the lower support 203. The two coils have the same appearances and structures. The axial thickness of each coil is the same as the axial thickness of either of the lower magnet 208 and the upper magnet 209. The inner diameter of each soil is larger than the outer diameter of either of the lower magnet 208 and the upper magnet 209. So, their axial motions are not interfered with each other. The distance between the lower end coil 206 and the upper end coil 207 is equal to the thickness of one coil.

The lower end coil 206 and the upper end coil 207 are respectively charged with currents in the opposite directions. At this time, these two coils produce an electromagnetic field in their surrounding space. The electromagnetic field and the magnetic fields of the lower magnet 208 and the lower magnet 209 per se are mutually acted to produce an electromagnetic stiffness opposite to the stiffness of the spring 204. Because the stiffness of the spring 204 is positive, such electromagnetic stiffness is called negative stiffness. Such electromagnetic stiffness and the stiffness of the spring are counteracted mutually; so, the stiffness of the whole QZS leg 2 is close to zero stiffness and is generally called QZS.

Further, the absolute displacement and attitude measurement principle is as follows:

The six QZS legs 2 are in the QZS state: so, the motion with the frequency higher than a certain value is isolated by the six QZS legs 2 and cannot be transferred to the reference platform 1 through the legs. 6-DOF motion transmissibility of the 6-DOF absolute displacement and attitude measurement device is shown in FIGS. 6A-6F. It can be seen in the drawing: motions corresponding to the frequencies below the 0 dB line are attenuated, and the attenuation rate below the 20 dB line achieves 90%.

Therefore, when the to-be-measured platform 3 generates the space motion (including the translation motion along the x axis, the y axis, and the x axis, and the rotation motion around the x axis, the y axis, and the x axis), the motion cannot be transferred to the reference platform 1 (the motion should be in the measurement range of the device). So, the reference platform 1 is in the stationary state. At this point, the deformation amounts of the six QZS legs 2 can be measured by the laser displacement sensors 213. The six deformation amounts are respectively inputted into the displacement and attitude resolver 4, and by forward kinematic solution of the 6-DOF device, the displacement and the attitude of the to-be-measured platform 3 can be obtained.

FIGS. 7A-7F show 6-DOF measurement drawings in space by the 6-DOF absolute displacement and attitude measurement device.

In the embodiment, the six QZS legs 2 are arranged as follows:

the six QZS legs 2 respectively are the first leg, the second leg, the third leg, the fourth leg, the fifth leg, and the sixth leg. The lower end spherical joints 201 of the first leg and the second leg are adjacent. The lower end spherical joints 201 of the third leg and the fourth leg are adjacent. The lower end spherical joints 201 of the fifth leg and the sixth leg are adjacent. The three groups of adjacently arranged lower end spherical joints 201 are uniformly distributed on the top of the to-be-measured platform 3 by spacing 120 degrees. Then, the upper end spherical joints 202 of the second leg and the third leg are adjacent. The upper end spherical joints 202 of the fourth leg and the fifth leg are adjacent. The upper end spherical joints 202 of the sixth leg and the first leg are adjacent. The three groups of adjacent arranged upper end spherical joints 202 are uniformly distributed on the bottom of the reference platform 1 by spacing 120 degrees. Meanwhile, the three groups of adjacently arranged lower end spherical joints 201 and the three groups of adjacent arranged upper end spherical joints 202 are interleaved with each other in the upright direction. So, each leg has a certain gradient.

The arrangement manner of the six QZS legs 2 is not limited in the embodiment. The above arrangement manner merely is one implementable manner. It can be properly adjusted according to requirements in the actual use. All the arrangement manners should fall into the protection scope of the present invention.

It should be noted that: for those skilled in the art, apparently, the present invention is not limited to details of the exemplary embodiments, and may be expressed in other specific forms without departing from the spirit or basic characteristics of the present invention. Therefore, in any way, the embodiments should be regarded as exemplary, not limitative; and the scope of the present invention is limited by the appended claims, instead of the above description. Thus, all variations intended to fall into the meaning and scope of equivalent elements of the claims should be covered within the present invention. Any reference signs in the claims shall not be regarded as limitations to the concerned claims.

Several examples are used for illustration of the principles and implementation methods of the present invention. The description of the embodiments is merely used to help illustrate the method and its core principles of the present invention. In addition, a person of ordinary skill in the art can make various modifications in terms of specific embodiments and scope of application in accordance with the teachings of the present invention. In conclusion, the content of this specification shall not be construed as a limitation to the present invention.

What is claimed is:

1. A QZS based 6-DOF absolute displacement and attitude measurement device, comprising a reference platform, a to-be-measured platform, a displacement and attitude resolver, and six QZS legs with the same structures, wherein two ends of each QZS leg are respectively connected with the reference platform and the to-be-measured platform through spherical joints;

each QZS leg includes a lower support, a spring, a shaft, a lower end coil, an upper end coil, a lower end magnet, an upper end magnet, an upper support, and a laser displacement sensor; the upper end magnet and the lower end magnet are in a mutual repulsion state and are respectively fixed to the shaft through two retaining rings; the lower end coil and the upper end coil are located on outer sides of the lower end magnet and the upper end magnet and are fixed to an inner wall of the lower support; there is no relative motion among the lower end coil, the upper end coil, and the lower support; a space is reserved between the lower end coil and the upper end coil; the lower end coil and the upper end coil are charged with currents in opposite directions; one end of the shaft is connected with an end part of the inner wall of the lower support through the spring, and another end of the shaft is connected with the end part of the upper support; the laser displacement sensor is used for measuring deformation amount information of each of the six QZS legs; each laser displacement sensor inputs the deformation amount information into the displacement and attitude resolver; and the displacement and attitude resolver solves to obtain displacement and attitude of the to-be-measured platform.

2. The QZS based 6-DOF absolute displacement and attitude measurement device according to claim 1, wherein the upper end magnet and the lower end magnet have the same appearances and structures, and a magnetizing direction of each of the upper end magnet and the lower end magnet is along a longitudinal axis of each QZS leg; the upper end magnet and the lower end magnet are in the mutual repulsion state.

3. The QZS based 6-DOF absolute displacement and attitude measurement device according to claim 1, wherein the two retaining rings are respectively a lower end retaining ring and an upper end retaining ring; the upper end magnet and the lower end magnet are respectively fixed to the shaft through the upper end retaining ring and the lower end retaining ring; the two retaining rings are in dead lock.

4. The QZS based 6-DOF absolute displacement and attitude measurement device according to claim 1, wherein the upper end coil and the lower end coil have the same appearances and structures; a thickness of each of the upper end coil and the lower end coil along a longitudinal axis of each QZS leg is the same as a thickness of each respective one of the upper end magnet and the lower end magnet along the longitudinal axis of each QZS leg.

5. The QZS based 6-DOF absolute displacement and attitude measurement device according to claim 4, wherein a width of the space between the upper end coil and the lower end coil is equal to a thickness of each respective one of the upper end coil and the lower end coil along the longitudinal axis of each QZS leg.

6. The QZS based 6-DOF absolute displacement and attitude measurement device according to claim 1, wherein inner diameters of the upper end coil and the lower end coil are larger than outer diameters of the lower end magnet and the upper end magnet.

7. The QZS based 6-DOF absolute displacement and attitude measurement device according to claim 1, wherein one end of the upper support is nested in the inner wall of the lower support and is connected with the shaft, and the other end of the upper support is connected with the reference platform through a spherical joint.

8. The QZS based 6-DOF absolute displacement and attitude measurement device according to claim 7, wherein the laser displacement sensor is mounted on an outer wall of a non-nested end of the upper support, and a space is reserved between the laser displacement sensor and an end part of the lower support close to the laser displacement sensor.

* * * * *